United States Patent [19]
Arnold et al.

[11] 4,272,982
[45] Jun. 16, 1981

[54] FLUID FLOW METER FOR MIXED LIQUID AND GAS

[75] Inventors: Dan M. Arnold; Robert W. Pitts, Jr., both of Houston, Tex.

[73] Assignee: Texaco Inc., White Plains, N.Y.

[21] Appl. No.: 85,571

[22] Filed: Oct. 17, 1979

[51] Int. Cl.³ .......................... G01N 9/24; G01F 1/90
[52] U.S. Cl. .................................... 73/19; 73/861.02; 73/861.04; 73/259
[58] Field of Search .............. 73/19, 194 M, 198, 232, 73/233, 253, 259, 61.4 R, 861.01, 861.02, 861.03, 861.04

[56] References Cited
U.S. PATENT DOCUMENTS

| | | | |
|---|---|---|---|
| 582,280 | 5/1897 | Goodwin et al. | 73/259 X |
| 1,996,150 | 4/1935 | Eches et al. | 73/233 |
| 2,216,016 | 9/1940 | Marsh | 73/233 |
| 3,020,758 | 2/1962 | Granberg et al. | 73/194 R |
| 3,678,257 | 7/1972 | Lilley et al. | 73/194 M |

*Primary Examiner*—James J. Gill
*Attorney, Agent, or Firm*—Carl G. Ries; Robert A. Kulason; Henry C. Dearborn

[57] ABSTRACT

A fluid flow meter for a fluid containing mixed liquid and gas. It has positive displacement structure that incorporates density measurement of segments of the mixed liquid and gas, while the linear velocity of both components is the same. There may be means for measuring the pressure and temperature of the fluid segments in order to determine the volume of the gas component.

2 Claims, 4 Drawing Figures

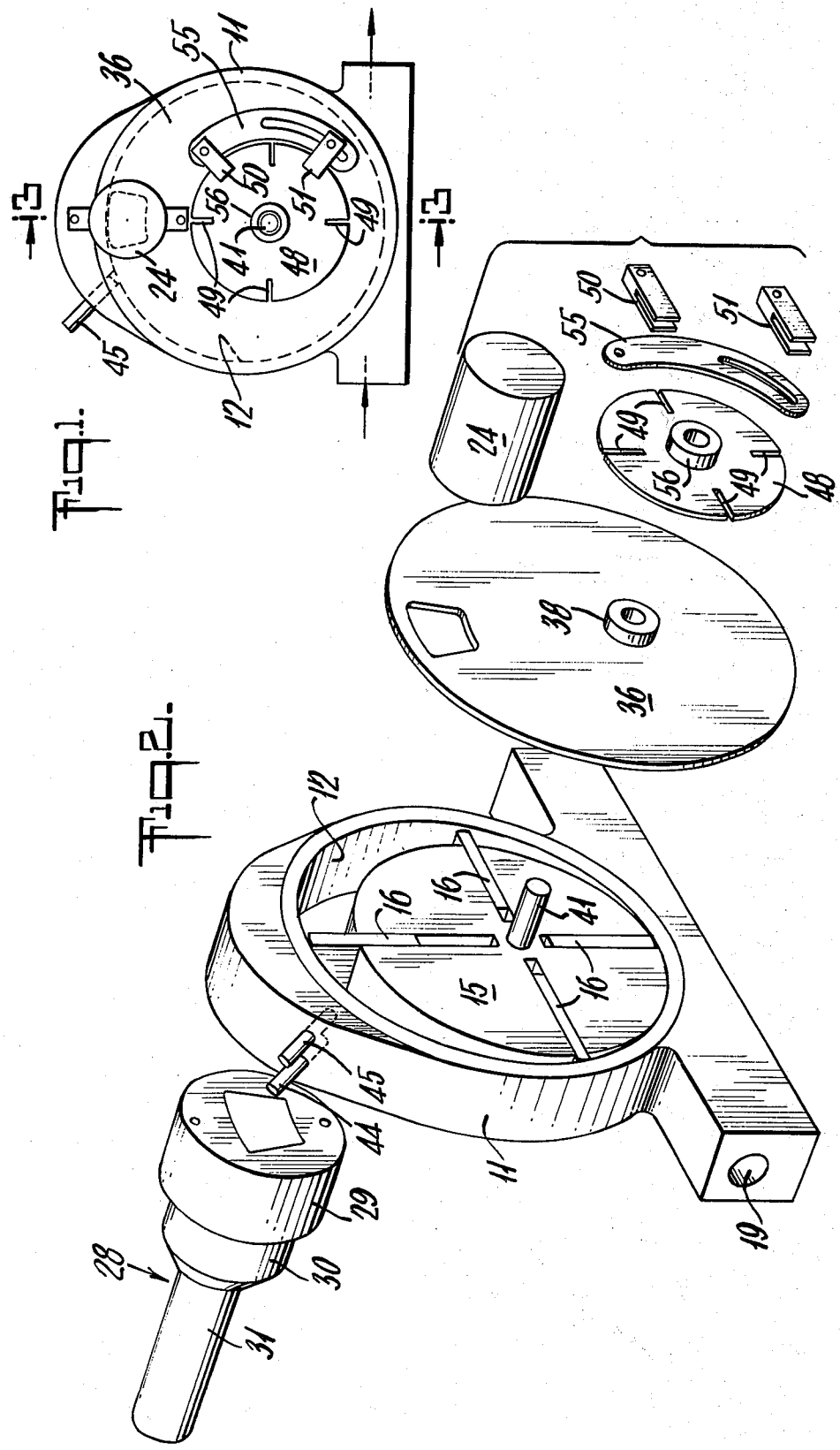

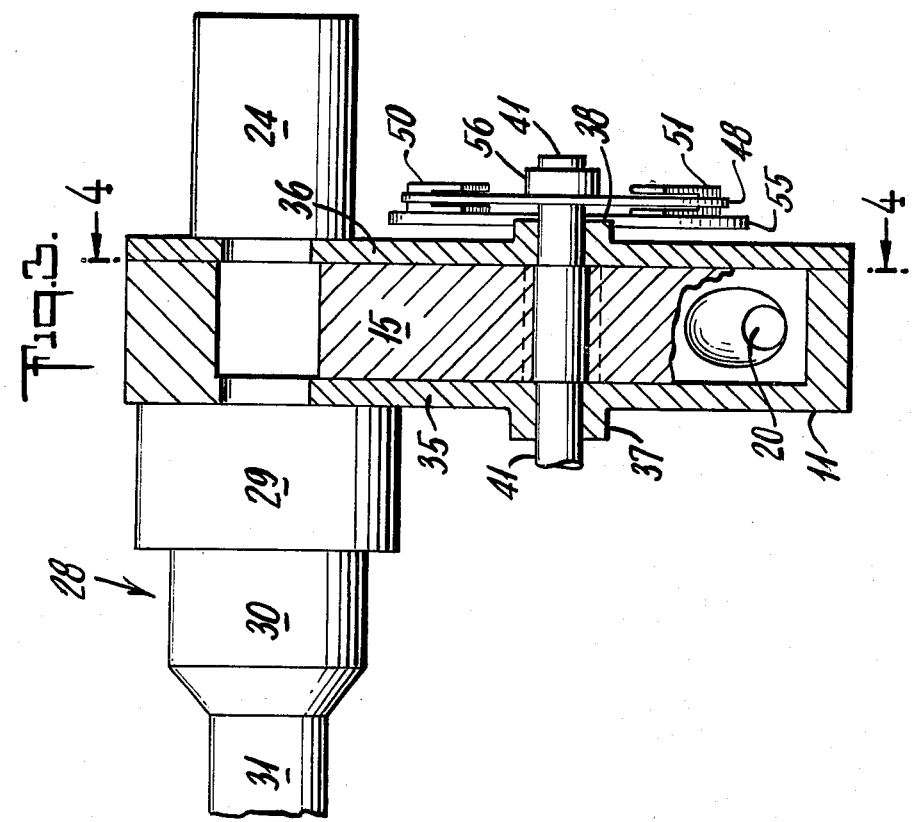
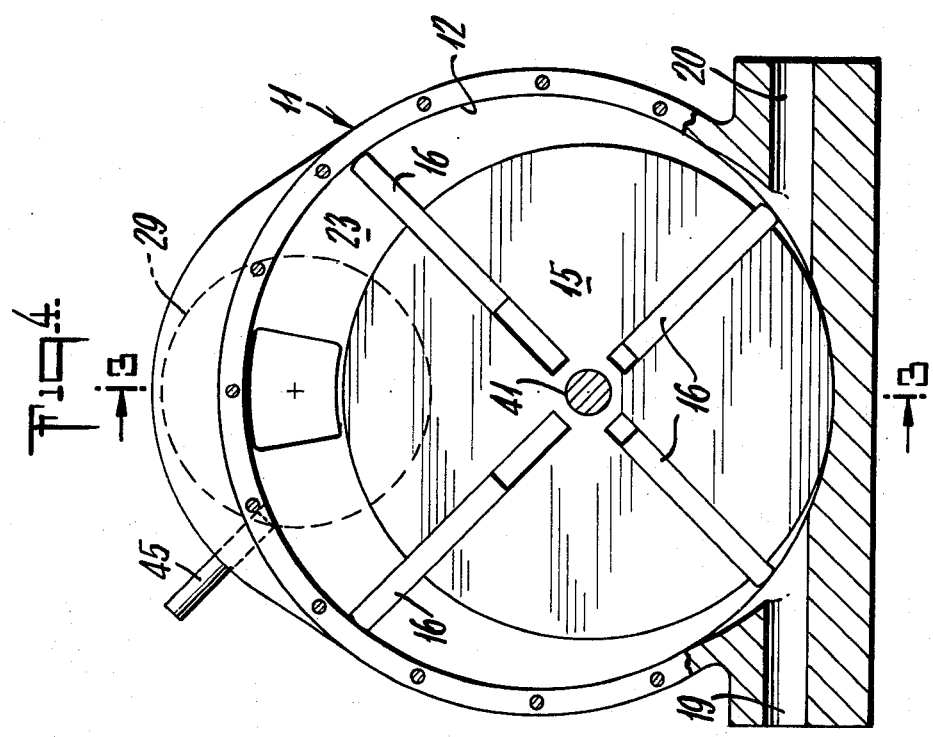

FLUID FLOW METER FOR MIXED LIQUID AND GAS

BACKGROUND OF THE INVENTION

1. Field of the Invention

This invention concerns fluid flow measurement, in general. More specifically, it relates to a multi-phase flow meter that is applicable to a fluid that includes both liquid and gas components therein.

2. Description of the Prior Art

Heretofore there have been various suggestions for measuring fluids having more than one phase component, but such phases were both liquids. There has historically been a major problem in measuring flow rates of a mixture including gas as well as liquid because the flow rates of these two components have a great tendency to be different. Consequently, in the petroleum industry it has been the practice to have a test separator at a crude oil collection point for making individual flow measurements of the gas and liquid. Such procedure could be eliminated by use of a continuous flow multi-phase meter for both liquid and gas according to this invention.

Examples of prior meter structures for measuring flow rate of multi-phase fluids that only are applicable to liquid phases are the two U.S. Pat. Nos. 2,936,618 to H. S. Milam, May 17, 1960 and 3,304,766 to L. M. Hubby, Feb. 21, 1967. It may be noted that the Milam patent makes cyclic measurements of the quantity of water in a fluid mixture of oil and water, while the Hubby patent measures the thermal capacity of the mixed fluid in order to determine the constituent amounts of oil and water in the mixture. Neither of these patents makes provision for measuring the rate of flow of a gas which might be included in a fluid mixture.

Consequently, it is an object of this invention to provide a fluid flow meter that makes positive displacement measurements which maintain the volume flow rate of a mixed fluid while maintaining the linear velocity of the liquid and gas components thereof the same.

SUMMARY OF THE INVENTION

Briefly, the invention concerns a fluid flow meter for continuously measuring rate of flow of a mixed fluid having both liquid and gas components. It comprises in combination positive displacement meter means for measuring total volume flow rate of said mixed fluid, and means integral with said positive displacement meter means for measuring the density of said mixed fluid while maintaining the linear velocities of said liquid and gas components the same.

Again briefly, the invention concerns a fluid flow meter for continuously measuring rate of flow of a mixed fluid having both liquid and gas components. It comprises in combination positive displacement meter means which means comprises a housing having a circular cross-section interior with tangential inlet and outlet passages adjacent to one side thereof. The positive displacement meter means also comprises a rotor eccentrically located in said interior and the rotor incorporates a balanced plurality of radial vanes that are biased into sealing relation with said housing interior, in order to divide the said mixed fluid stream into a least one segment during flow through the meter. It also comprises a gamma ray densitometer having a beam directed across the said segment adjacent to the other side of said housing interior, for measuring the density of said mixed fluid in order to determine the percent of one of said components. It also comprises means mounted on said housing for measuring the pressure of said mixed fluid segment, and means mounted on said housing for measuring the temperature of said mixed fluid segment. All of the combination is such that the linear flow rate of both liquid and gas components of the said mixed fluid will be equal during the indicated measurements.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a side elevation of a meter according to the invention;

FIG. 2 is an exploded perspective, illustrating the meter as shown in FIG. 1 but somewhat enlarged;

FIG. 3 is an enlarged longitudinal cross-sectional view taken along the lines 3—3 of FIGS. 1 and 4; and FIG. 4 is an enlarged view, partly in cross-section, taken along the lines 4—4 on FIG. 3 and looking in the direction of the arrows.

DESCRIPTION OF THE PREFERRED EMBODIMENT

A fluid flow meter according to this invention is illustrated in the drawings. It utilizes the principles of a positive displacement pump which is driven by the fluid to be measured. The fluid is trapped in a segment, or reservoir of the pump and the rotor turns like a motor due to the unequal pressure on the vanes.

With reference to the figures of the drawings, it will be observed that the above indicated positive displacement meter structure has a housing 11 with a circular (in cross-section) interior 12. There is a rotor 15 that is eccentrically located relative to the housing interior 12. And, there are four radially situated vanes 16 that are symmetrically located and mounted in the rotor 15. These vanes 16 are biased radially outward (in any feasible manner—not shown) into sealing relation with the interior 12 of the housing 11.

The housing 11 includes a pair of tangenital inlet and outlet passages 19 and 20, respectively, which connect into the interior 12 of the housing as clearly shown in FIG. 4 of the drawings. It will be appreciated that the structure is symmetrical so that the inlet and outlet passages might be reversed which would reverse the direction of rotation of the rotor 15 when fluid flows through the meter.

It will be noted that as the rotor 15 is driven by reason of the differential in fluid pressure, the vanes 16 will act to divide the stream of fluid into segments. For example, there is a segment 23 formed when the vanes 16 are in the position illustrated in FIG. 4. Both the liquid and gas components of the mixed fluid are trapped in such a segment so that the linear rate of flow through the meter will be equal for both of these components.

In order to measure the density of the mixed fluid as it flows through the meter, there is a gamma ray densitometer which is made up of a gamme ray source (not shown) that may be a small quantity of cesium 137. That source is embedded in a source collimator 24. It has an interior passage (not shown) to create a columnar beam of the gamma rays which is directed across the upper portion of the interior 12 of the housing 11. Such beam is directed toward a scintillation detector 28 which may be like a commercial instrument manufactured by Bicron Corporation of Newbury, Ohio. It includes a collimator section 29 and a scintillation crystal section 30, as well as a photomultiplier tube 31.

It will be understood that the interior 12 of the housing 11 is enclosed by face plates 35 and 36. These face plates incorporate hubs 37 and 38, respectively, to act as bearings for a shaft 41 that supports the rotor 15.

There is a temperature sensor 44 and a pressure sensor 45. These are located adjacent to one another and extend effectively into the sector 23. As indicated above, the sector 23 is formed at the top of the interior 12 when the vanes 16 are in a position such as that illustrated in FIG. 4.

It will be appreciated that there is an arrangement for measuring the rotation of the rotor 15 so that the velocity of the fluid flow may be measured. Of course, any feasible arrangement might be employed and one example is illustrated. It makes use of a disc 48 that is mounted on the shaft 41 securely, for rotation therewith. The disc 48 has four radial notches 49 that may act to create signals when they pass a pair of bifurcated elements 50 and 51 that are mounted on an arcuate arm 55 and have their bifurcated ends extend over the outer periphery of the disc 48. There is a hub 56 on the disc 48 that fits on the shaft 41.

In the operation of a meter according to this invention, it may be noted that the total volume flow rate through the meter, may be expressed by the following equation:

$$V_T = WRlS \tag{1}$$

where
W = the volume of the segment 23 (in barrels);
R = the number of segments;
S = rotation speed of the rotor 15 (revolutions per minute); and
$l$ = conversion constant (minutes per day) = 1440.

Then considering the two constituent elements of the fluid, i.e. the liquid and the gas, the volume flow rate of liquid $V_1$ which is flowing in the line can be solved by using the following relationship:

$$V_1 = \rho V_T \tag{2}$$

where
$\rho$ = the fractional percent liquid.

Then the volume flow rate of gas, $V_g$ at standard temperature and pressure can be determined from the following equation:

$$V_g = (l-\rho)V_T(460/T+460)(P_g+14.7/14.7)k \tag{3}$$

where
T = temperature of the fluid within the meter (°K.);
$P_g$ = gauge pressure within the meter (psi);
k = conversion factor to give $V_g$ in cubic feet per day.

It will be understood that the percent liquid fraction may be determined by using the densitometer measurement. As indicated above, the gamma ray source may be a few millicurries of cesium 137 or of cobalt 60, and it will be understood that the gamma radiation response of the detector is biased so that only primary (unscattered) gamma rays are counted by the detector. The primary gamma radiation count rate recorded by the detector is given by the equation:

$$C = C_o e^{-n\rho x} \tag{4}$$

where
$C_o$ = the count rate recorded by the detector when the segment is filled with gas at operating temperature and pressure;
C = the count rate recorded by the detector when the segment is filled with the fluid being measured;
x = the effective distance traversed by the gamma radiation;
n = the attenuation coefficient of the primary gamma radiation, and
$\rho$ = the fractional percent of liquid in the fluid.

Then solving equation (4) for $\rho$ yields:

$$\rho = [\ln(C_o/C)]/nx \tag{5}$$

The term n is known and the terms $C_o$ and x are measured by a calibration procedure. It will be clear that such calibration would involve using only the gas to obtain the count rate $C_o$ and then using only the liquid for obtaining the count when $\rho$ is known to be 1.0. This would provide two known values of $\rho$ with corresponding counting rates C. These values are used to solve equation (4) simultaneously for $C_o$ and x. Then substituting equation (5) and (1) into equation (2) gives the volume flow rate of the liquid which may be expressed as follows:

$$V_1 = [\ln(C_o/C)]wRlS/nx \tag{6}$$

where the terms on the right hand side of the equation are either measured (c,S) or are known ($C_o$,w,R,l,n,x).

Then by substituting equations (5) and (1) into equation (3), the volume flow rate of the gas may be expressed as $$V_g = (l-(\ln(C_o/C)/nx))\cdot(WRlS)\cdot(460/T+460)\cdot(P_g+14.7/14.7)\cdot k \tag{7}$$

It will be understood that the pressure $P_g$ and temperature T will be measured within the segment 23 of fluid flowing through the meter, by using the sensors 44 and 45. The speed at which the rotor 15 is rotating (i.e. S) can, of course, be monitored continuously. Consequently, the terms of the right hand side of equation (7) are either measured ($P_g$, T, C, S) or are known ($C_o$, n, x, w, R, l, k). It may be noted that the equations (6) and (7) are the working equations for the positive displacement flow meter according to this invention.

It will be appreciated by anyone skilled in the art that various techniques could be employed to continuously or periodically make a determination of $V_g$ and $V_l$ which are the quantities of interest. These determinations would be made in accordance with the working equations (6) and (7).

It will also be appreciated that it might be necessary to have a synchronizing device (not shown) to disable the gamma ray beam as each of the vanes 16 passes.

While a particular embodiment of the invention has been described above in considerable detail, in accordance with the applicable statutes, this is not to be taken as in any way limiting the invention but merely as being descriptive thereof.

We claim:

1. Fluid flow meter for continuously measuring the rate of flow of a mixed fluid having both liquid and gas components, comprising in combination positive displacement meter means comprising a housing having a circular cross section interior with tangential inlet and outlet passages adjacent to one side thereof, a rotor eccentrically located in said interior and incorporating a balanced plurality of radial vanes biased into sealing relation with said housing interior for dividing said mixed fluid stream into at least one segment during flow through the meter, a gamma ray densitometer having a beam directed across said segment adjacent to the other side of said housing interior for measuring the density of said mixed fluid in order to determine the percent of one of said components, means mounted on said housing for measuring the pressure of said mixed fluid segment, and means mounted on said housing for measuring the temperature of said mixed fluid segment, all whereby the linear flow rate of both liquid and gas components of said mixed fluid will be equal during said measurements.

2. Fluid flow meter for continuously measuring rate of flow of a mixed fluid stream having both liquid and gas components, comprising in combination positive displacement meter means for measuring total volume flow rate of said mixed fluid, comprising (a) a circular housing, and (b) a rotor incorporating a plurality of radial vanes biased into sealing relation with said housing for dividing said mixed fluid stream into at least one segment with fluid tight separation from the remainder of said stream, (c) said rotor being eccentrically located relative to said housing, gamma ray densitometer means directed across said fluid stream segment for measuring the density of said mixed fluid while maintaining the linear velocities of said liquid and gas components the same, and means for measuring the pressure and temperature of said fluid stream segment.

* * * * *